United States Patent [19]
Jansen et al.

[11] Patent Number: 5,134,216
[45] Date of Patent: Jul. 28, 1992

[54] EPOXIDE-CONTAINING TWO-COMPONENT POLYURETHANE ADHESIVES

[75] Inventors: Bernhard Jansen, Cologne; Hanns-Peter Müller, Bergisch-Gladbach; Horst Stepanski, Leverkusen; Guenter Arend, Dormagen, all of Fed. Rep. of Germany

[73] Assignee: Bayer Aktiengesellschaft, Fed. Rep. of Germany

[21] Appl. No.: 525,565

[22] Filed: May 18, 1990

[30] Foreign Application Priority Data

May 24, 1989 [DE] Fed. Rep. of Germany .... 39-16-932

[51] Int. Cl.$^5$ ...................... C08G 18/06; C08G 18/32
[52] U.S. Cl. .......................... 528/48; 528/50; 528/52; 528/53; 528/65; 528/68; 528/69; 528/85
[58] Field of Search ...................... 528/53, 50, 65, 85, 528/48, 68, 69, 52

[56] References Cited

U.S. PATENT DOCUMENTS

| 4,595,741 | 6/1986 | Kamatani et al. | 528/53 |
| 4,613,660 | 9/1986 | Goel | 528/73 |
| 4,698,408 | 10/1987 | Goel et al. | 528/53 |
| 4,716,182 | 12/1987 | Hess et al. | 528/85 |
| 4,726,868 | 2/1988 | Goel et al. | 156/307.3 |
| 4,728,676 | 3/1988 | Muller et al. | 521/107 |
| 4,740,539 | 4/1988 | Goel | 523/400 |
| 4,788,224 | 11/1988 | Muller et al. | 521/104 |
| 4,843,119 | 6/1989 | Schapira et al. | 524/730 |

FOREIGN PATENT DOCUMENTS

| 331996 | 9/1989 | European Pat. Off. . |
| 357995 | 4/1990 | European Pat. Off. . |
| 368031 | 5/1990 | European Pat. Off. . |

Primary Examiner—John Kight, III
Assistant Examiner—John M. Cooney, Jr.
Attorney, Agent, or Firm—Joseph C. Gil; Godfried R. Akorli

[57] ABSTRACT

Improved two-component polyurethane adhesives contain an isocyanate and a stabilized epoxide and at least one isocyanate-reactive compound.

9 Claims, No Drawings

EPOXIDE-CONTAINING TWO-COMPONENT POLYURETHANE ADHESIVES

BACKGROUND OF THE INVENTION

The present invention relates to new two-component polyurethane adhesives of improved flexibility which are particularly suitable for adhering SMC (sheet molding compounds) and metals.

Two-component polyurethane adhesives which are based on a combination of polyurethanes with epoxides have been known for a long time and in many different variations, but have some disadvantages. Two-component polyurethane adhesive systems are described in U.S. Pat. Nos. 4,613,660, and 4,726,868, and published European application Nos. 279,721 and 256,162. In the compositions described in these references, the isocyanate component is reacted with a polyol-epoxide mixture which contains the catalysts. The choice of catalysts which can be used is severely limited because of possible side reactions in order to ensure the storage stability of the mixture. The limited choice of possible catalysts is a disadvantage.

In addition, systems are also known in which the epoxide is contained in the isocyanate component. According to U.S. Pat. No. 4,698,408, one-component is an epoxide-isocyanate mixture and the other component is a mixture of a polyol and an amine, which contains both urethanization and epoxide hardening catalysts. According to U.S. Pat. No. 4,740,539, an epoxide is a constituent of the isocyanate component, whereas an epoxide hardening catalyst is added. According to U.S. Pat. No. 4,740,539, two independent polymer networks (inter-penetrating network) are said to be formed.

However, all the system with isocyanate/epoxide mixtures have the common feature that the epoxides must be as free as possible from hydroxyl functions, so that no side reactions at all impair the storage stability, since mixtures of this type are known to keep for only a limited period and to become resinous rapidly.

Processes for the two-stage production of shaped articles by reaction of an organic polyisocyanate and an epoxide using an alkylating sulphonic acid alkyl ester of methyl iodide or of dimethyl sulphate and if appropriate auxiliaries and additives containing hydroxyl groups are known from German Auslegeschrift 3,644,382. The resulting resins can be employed as adhesives, but do not have the flexibility required for many applications.

DESCRIPTION OF THE INVENTION

The invention is based on the object of providing a two-component polyurethane adhesive system of improved storage stability and flexibility.

The invention is directed to a two-component adhesive comprising:
a storage-stable mixture comprising
  1) at least one organic polyisocyanate and
  2) at least one epoxide which has been stabilized against reaction with a1) by reaction with an alkylating agent and
b) a storage-stable component comprising
  1) at least one organic compound containing at least one hydroxyl group and at least one amino group,
  2) at least one organic compound containing at least two hydroxyl groups and no amino groups,
  3) a mixture of an organic compound containing at least two hydroxyl groups and no amino groups and an organic compound containing at least two amino groups and no hydroxyl groups, and
  4) mixtures thereof.

In a preferred embodiment, the composition also contains other customary auxiliaries and additives. In a particularly preferred embodiment, component b) contains catalysts, and in particular tertiary amines, which should be present in an amount such that the total mixture contains at least 0.005 mol tertiary amine nitrogen per 100 g, taking into account any tertiary nitrogen contained in component b).

In another preferred embodiment, the proportions of components a1) and a2) are adjusted so that the total component a) contains 5 to 40 wt. %, preferably 10 to 30 wt. %, bisglycidyl ether of bisphenol A or equivalent amounts of other epoxide-containing compounds, and that 0.05 to 0.95 mol isocyanate-reactive groups of the total component b) are present per mol of isocyanate groups of the total component a).

In a particularly preferred embodiment, the isocyanate-reactive groups of component b) are hydroxyl and amino groups, the amount of amino groups in particular being 1 to 15, especially 2 to 13 mol % based on the sum of hydroxyl and amino groups.

Possible isocyanate components are, above all, compounds of the following formula:

$$Q(NCO)_n$$

wherein n=2–4, preferably 2, and Q is selected from the group consisting of aliphatic hydrocarbon radicals having 2 to 18 (preferably 6 to 10) carbon atoms, cycloaliphatic hydrocarbon radicals having 4 to 15 (preferably 5 to 10) carbon atoms, aromatic hydrocarbon radicals having 6 to 15 (preferably 6 to 13) carbon atoms, and araliphatic hydrocarbon radicals having 8 to 15 (preferably 8 to 13) carbon atoms.

Particularly preferred polyisocyanates are hexamethylene diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethylcyclohexane, hexahydrophenylene-1,3- and/or -1,4-diisocyanate, perhydrodiphenylmethane-2,4'-and/or -4,4'-diisocyanate, phenylene-1,3- and -1,4-diisocyanate, toluene-2,4- and -2,6-diisocyanate and mixtures of these isomers, diphenylmethane-2,4'- and/or -4,4'-diisocyanate, naphthylene- 1,5-diisocyanate, triphenylmethane-4,4',4"-triisocyanate or polyphenyl-polymethylene polyisocyanates, such as are obtained by aniline-formaldehyde condensation and subsequent phosgenation.

Suitable higher molecular weight polyisocyanates are modification products of such polyisocyanates, i.e. polyisocyanates having e.g. isocyanurate, carbodiimide, allophanate, biuret or uretdione structural units, such as can be prepared from the polyisocyanates of the type mentioned by processes of the prior art which are known per se. Of the higher molecular weight modified polyisocyanates, the prepolymers known from polyurethane chemistry having terminal isocyanate groups and of the molecular weight range from 400 to 10,000 preferably from 600 to 8,000 and in particular from 800 to 5,000, are of particular interest. These compounds are prepared in a manner which is known per se by reaction of excess amounts of polyisocyanates with organic compounds having at least two groups which are reactive towards isocyanate groups, in particular organic polyhydroxy compounds. Suitable such polyhydroxy compounds are both simple polyhydric alcohols of the molecular weight range from 62 to 599, preferably from 62 to 200, such as e.g. ethylene glycol, trimethylolpropane, propane-1,2-diol or butane-1,2-diol, and higher molecular weight polyether-polyols and/or polyester-polyols of the type generally known from polyurethane chemistry and having molecular weights from 600 to 8,000, preferably from 800 to 4,000, which contain at least two, as a rule 2 to 8, but preferably 2 to 4, primary and/or secondary hydroxyl groups. It is of course also possible to use those NCO prepolymers which have been obtained from polyisocyanates and less preferred compounds having groups which are reactive towards isocyanate groups, such as e.g. polythioether-polyols, polyacetals containing hydroxyl groups, polyhydroxypolycarbonates, polyester-amides containing hydroxyl groups or copolymers, containing hydroxyl groups, of olefinically unsaturated compounds. Compounds which have groups which are reactive towards isocyanate groups, in particular hydroxyl groups, and are suitable for the preparation of the NCO prepolymers are, for example, the compounds disclosed as examples in U.S. Pat. No. 4,218,543, column 7, line 29, to column 9, line 25. In the preparation of the NCO prepolymers, these compounds have groups which are reactive towards isocyanate groups are reacted with polyisocyanates at an NCO/OH equivalent ratio of about 1.5:1 to 20:1, preferably 5:1 to 15:1. The NCO prepolymers in general have an NCO content of 2.5 to 25, preferably 7 to 22 wt. %. From this, it can already be seen that in the context of the present invention, by "NCO prepolymers" and by "prepolymers having terminal isocyanate groups" there are to be understood both the reaction products as such and their mixtures with excess amounts of unreacted starting polyisocyanates, which are often also called "semi-prepolymers".

Polyisocyanate components which are particularly preferred for the process according to the invention are the commercially available polyisocyanates, such as hexamethylene diisocyanate; 1-isocyanato-3,3,5-trimethyl-5-isocyanatomethyl-cyclohexane (isophorone diisocyanate, abbreviated to: IPDI); 4,4'-diisocyanato-dicyclohexylmethane; 2,4-diisocyanatotoluene, its industrial mixtures with 2,6-diisocyanatotoluene; 4,4'-diisocyanatodiphenylmethane, its mixtures with the corresponding 2,4'- and 2,2'-isomers; polyisocyanate mixtures of the diphenylmethane series, such as can be obtained by phosgenation of aniline/formaldehyde condensates in a manner which is known per se; the modification products of these industrial polyisocyanates containing biuret or isocyanurate groups; and NCO prepolymers of the type mentioned based on these polyisocyanates; the simple polyols and/or polyetherpolyols and/or polyester-polyols; and mixtures of such polyisocyanates.

The epoxide component a2) is at least one organic compound which contains 1 to 4, in particular 1 to 2, epoxide groups per molecule at an epoxide equivalent weight of from 70 to 500, preferably from 170 to 220. Suitable compounds are monoepoxides, such as, for example, phenoxypropylene oxide, styrene oxide or glycidyl alcohol, or polyepoxides of higher functionality, such as, for example, polyglycidyl ethers of polyhydric phenols, in particular of bisphenol A, and also of other bisphenols of the general formula:

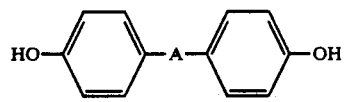

where A = —SO$_2$—, —CO—, —O—, —S—,

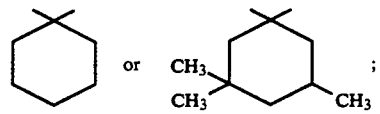

polyepoxide compounds based on aromatic amines, in particular bis(N-epoxypropyl)-aniline, N,N'-dimethyl-N,N'-diepoxypropyl-4,4'-diaminodiphenylmethane and N-diepoxypropyl-4-aminophenylglycidyl ether; polyglycidyl esters of cycloaliphatic dicarboxylic acids, in particular diglycidyl hexahydrophthalate, and polyepoxides of the reaction product of n mol hexahydrophthalic anhydride and 1 mol of a polyol having n hydroxyl groups (n=integer from 2 to 6), in particular 3 mol hexahydrophthalic anhydride and one mol 1,1,1-trimethylolpropane, and 3,4-epoxycyclohexylmethane-3,4-epoxycyclohexanecarboxylate.

The epoxides a2) are present in the components a) according to the invention in inhibited, i.e. in stabilized, form with respect to their reactivity towards isocyanate groups. This stabilization of the epoxides is effected by means of a heat treatment at 30° to 150° C. (preferably 80° to 130° C.) in the presence of an alkylating agent, which is in general employed in an amount of 0.005 to 1 wt. %, preferably 0.05 to 0.25 wt. %, based on the weight of the epoxide. The heat treatment is in general carried out for a period of 15 to 60 minutes and can take place either in the absence of the polyisocyanate component or in the presence of all or part of the polyisocyanate component. This means that the addition of the alkylating agent and also the subsequent heat treatment can take place either before combining the epoxide with the polyisocyanate or after the epoxide has been mixed with all or a part of the polyisocyanate.

Examples of suitable alkylating agents include methyl iodide, dimethyl sulphate or, preferably, sulphonic acid alkyl esters of molecular weight range from 110 to 250 and having 1 to 4 carbon atoms in the alkyl radical. These include both aliphatic sulphonic acid alkyl esters, such as methyl n-butanesulphonate, methyl n-perfluorobutanesulphonate and ethyl n-hexanesulphonate, and aromatic sulphonic acid alkyl esters, such as methyl, ethyl or n-butyl benzenesulphonate, methyl, ethyl or n-butyl p-toluenesulphonate, methyl 1-naphthalenesulphonate, methyl 3-nitrobenzenesulphonate or methyl 2-naphthalenesulphonate. The aromatic sulphonic acid esters mentioned as examples are preferred. Methyl p-toluenesulphonate is particularly preferred.

The epoxides are present in component a) in an amount such that 0.005 to 0.25, preferably 0.01 to 0.2 mol epoxide groups are present per 100 g component a).

The auxiliaries and additives can also be used include, for example, fillers, dyestuffs and pigments. Examples of fillers, in particular reinforcing fillers, which may be mentioned are: silicatic minerals, for example lamellar silicates, such as antigorite, serpentine, hornblends, amphibole, chrysotile and talc; metal oxides, such as kaolin, aluminum oxides, titanium oxides and iron oxides, and metal salts, such as chalk and baryte, and inorganic pigments, such as cadmium sulphide, zinc sulphide and glass, asbestos flour and the like. Naturally occurring and synthetic fibrous materials, such as asbestos, wollastonite and in particular glass fibers of various lengths, which can be sized are preferably used. Fillers can be used individually or as a mixture. The fillers are advantageously added to the reaction mixture in amounts of up to 50 wt. %, preferably up to 30 wt. %, based on the weight of components a) and b).

Further details on the customary auxiliaries and additives can be found in the technical literature, for example in the monograph by J. H. Saunders and K. C. Frisch "High Polymers" Volume XVI, Polyurethanes, Part 2 and 7, Verlag Interscience Publishers 1962 and 1964.

component b) of the present invention is a storage-stable component comprising 1) at least one organic compound containing at least one hydroxyl group and at least one amino group, 2) at least one organic compound containing at least two hydroxyl groups and no amino groups, 3) a mixture of an organic compound containing at least two hydroxyl groups and no amino groups and an organic compound containing at least two amino groups and no hydroxyl groups, and 4) mixtures thereof.

The compounds useful as component b) generally have molecular weights from 62 to 12,000, preferably 62 to 6,000, and generally contain 2 to 8, preferably 2 to 5, amino and/or hydroxyl groups. Particularly preferred amino groups are aromatic and aliphatic amino groups, primary aromatic and primary and secondary aliphatic amino groups. It is preferred that the hydroxyl groups be primary aliphatic hydroxyl groups.

Suitable compounds which include both hydroxyl and amino groups include 2-aminoethanol; 3-amino-1-propanol; 1-amino-2-propanol; 2-amino-1-butanol; 2-amino-2-methylpropanol; 2-amino-2-methyl-1,3-propanediol; 2-amino-2-hydroxymethyl-1,3-propanediol, and hydrogenated aminophenols of the formula:

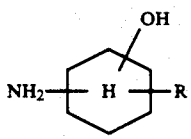

where R represents methyl, ethyl, Cl or $NO_2$.

Compounds which are suitable as component b) or part of component b) include both low molecular weight polyhydric alcohols (molecular weight range from 62 to 400), such as ethylene glycol, diethylene glycol, 1,4-dihydroxybutane, 1,6-dihydroxyhexane, trimethylolpropane, glycerol, pentaerythritol, sorbitol or sucrose, and higher molecular weight polyhydroxy compounds (molecular weight range from 400 to 12,000, preferably from 400 to 6,000), such as, for example, polyhydroxy-polyethers of the type known per se from polyurethane chemistry. These are accessible in a manner which is known per se by alkoxylation of suitable starter molecules, such as the polyhydric alcohols mentioned as examples, or of ammonia or amines, such as ethylenediamine, hexamethylenediamine, 2,4-diaminotoluene or aniline, or amino-alcohols, such as amino-ethanol, using propylene oxide and/or ethylene oxide in any desired sequence of these alkylene oxides. The alkoxylation of amines results in polyols with tertiary amine nitrogens, which can catalyze the reaction between isocyanate and hydroxyl groups as well as isocyanate trimerization.

Polyester-polyols such as are accessible in a manner which is known per se by reaction of low molecular weight alcohols with polybasic carboxylic acids, such as adipic acid, phthalic acid, hexahydrophthalic acid or tetrahydrophthalic acid, or the anhydrides of these acids, are furthermore suitable.

Those higher molecular weight polyhydroxypolyethers in which high molecular weight polyadducts or polycondensates or polymers are present in finely dispersed, dissolved or grafted form are also suitable. Such modified polyhydroxy compounds are obtained e.g. when polyaddition reactions (e.g. reactions between polyisocyanates and compounds with amino functions) or polycondensation reactions (e.g. between formaldehyde and phenols and/or amines) are allowed to proceed in situ in the compounds containing hydroxyl groups. Such processes are described, for example, in German Auslegeschriften Nos. 1,168,075, 1,260,142, 2,324,134, 2,423,984, 2,512,385, 2,513,815, 2,550,796, 2,550,797, 2,550,833, 2,550,862, 2,633,293, and 2,639,254. However, according to U.S. Pat. No. 3,869,413 or German Auslegeschrift No. 2,550,860, it is also possible for a finished aqueous polymer dispersion to be mixed with a polyhydroxy compound and the water then to be removed from the mixture.

Polyhydroxy compounds modified by vinyl polymers, such as are obtained e.g. by polymerization of styrene and acrylonitrile in the presence of polyethers (U.S. Pat. Nos. 3,383,351, 3,304,273, 3,523,093 and 3,110,695; and German Auslegeschrift No. 1,152,536) or polycarbonate-polyols (German patent No. 1,769,795; and U.S. Pat. No. 3,637,909) are also suitable as component b) for the process according to the invention. If polyether-polyols which have been modified in accordance with German Auslegeschriften 2,442,101, 2,644,922 and 2,646,141 by grafting polymerization with vinylphosphonic acid esters and if appropriate (meth)acrylonitrile, (meth)acrylamide or OH-functional (meth)acrylic acid esters are used, plastics of particularly desirable flame retardancy are obtained.

Representatives of the compounds mentioned which are to be used according to the invention as compounds b) are described e.g. in High Polymers, Vol. XVI, "Polyurethanes, Chemistry and Technology", published by Saunders-Frisch, Interscience Publishers, New York, London, Volume I, 1962, pages 32-42 and pages 44-54 and Volume II, 1964, pages 5-6 and 198-199, and in Kunststoff-Handbuch (Plastics Handbook), Volume VII, Vieweg-Höchtlen, Carl-Hanser-Verlag, Munich, 1966, e.g. on pages 45-71.

In a particularly preferred embodiment, component b) contains a mixture of short-chain polyols of functionalities 2 and 4 and a long-chain polyol of functionality 2.

Component b) otherwise also contains amino functions. Useful amines include in particular low molecular weight aromatic or aliphatic diamines, preferably having a molecular weight up to 300. Preferred diamines are aromatic diamines, such as 1,4-diaminobenzene, 2,4-diaminotoluene and 2,4'- and/or 4,4'-diaminodiphenylmethane, or, preferably, those diamines which contain at least one alkyl substituent each in an ortho-position relative to the amino groups. Most preferred are those compounds which contain in the ortho-position relative to the first amino groups at least one alkyl substituent and in the ortho-position relative to the second amino group two alkyl substituents having in each case 1 to 3 carbon atoms. Particularly preferably are those which contain in each case in at least one ortho-position relative to the amino groups an ethyl, n-propyl and/or isopropyl substituent and if appropriate methyl substituents in other ortho-positions relative to the amino groups. These preferred and particularly preferred diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene its industrial mixtures with 1-methyl-3,5-diethyl-2,6-diaminobenzene-4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3',5'-diisopropyl-4,4'-diaminodiphenylmethane. Any desired mixtures of such aromatic amines can likewise be employed.

Particularly preferred aliphatic diames are isophoronediamine, bis-(4-aminocyclohexyl)-methane, 1,4-diaminocyclohexane, ethylenediamine and its homologues and piperazine.

Compounds which are furthermore suitable as component b) or as part of component b) are polyether-polyamines containing terminal aromatic primary amino groups, such as are accessible, for example, in accordance with the processes described in European patent No. 79,536, German Auslegeschriften Nos. 2,948,419, 2,019,432, and 2,619,840, and U.S. Pat. Nos. 3,808,250, 3,975,426 or 4,016,143.

Component b) particularly preferably consists of polyols of the type mentioned as examples of molecular weight range from 62 to 6,000 and having a hydroxyl functionality of 2 to 4, and, polyether-polyamines containing terminal, aromatic, primary amino groups and the above-mentioned aliphatic diamines.

The catalysts present if necessary in component b) are preferably tertiary amines, which preferably contain no groups which are reactive towards isocyanate groups and have a molecular weight of 101 to 250. Possible catalysts are, in particular, the tertiary amine catalyst of polyurethane chemistry which are known per se, such as, for example, triethylamine, tributylamine, N-methylmorpholine, N-ethylmorpholine, N-coconut-morpholine, N,N,N',N'-tetramethylethylenediamine, 1,4-diazabicyclo-(2,2,2)-octane, N-methyl-N'-dimethylamino-ethylpiperazine, N,N-dimethylcyclohexylamine, N,N,N',N'-tetramethyl-1,3-butanediamine, N,N-dimethylimidazole-β-phenylmethylamine, 1,2-dimethylimidazole or 2-methylimidazole. The preferred tertiary amines include N,N-dimethylbenzylamine or the compounds of the formulae

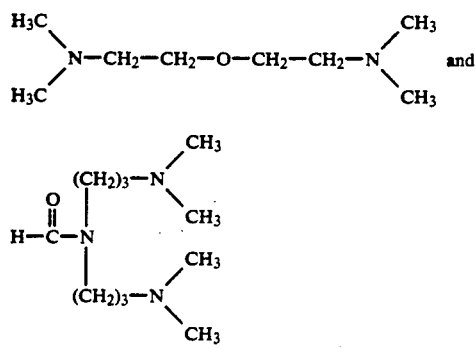

The last of the two compounds mentioned and 1,4-diazabicyclo(2,2,2)-octane are particularly preferred, since they are not volatile and are essentially odorless under the conditions of the process according to the invention.

The tertiary amines are preferably present in the systems according to the invention in an amount such that the content of tertiary amine nitrogen atom, including any tertiary amine nitrogen atoms which may be present in component b), is at least 0.005 mol/100 g, preferably at least 0.01 mol/100 g of the total reaction mixture (sum of components a) and b)). The tertiary amines are also preferably additionally co-used if an amount of tertiary amine nitrogen atom in component b) lying within the ranges mentioned is present, and in particular in an amount which corresponds to a content of the systems (sum of components a) and b)) of tertiary amine nitrogen originating from component b) of 0.005 to 0.15 mol/100 g.

The present invention also relates to the gluing by means of the two-component polyurethane adhesive systems according to the invention, of substances of SMC, PPS (polyphenylenesulfides) or other plastics, metals, such as e.g. steel, galvanized steel or aluminum, wood or glass.

The two-component polyurethane adhesive is preferably used by continuous mixing of the two components a) and b) either in a stirred mixer, in a static mixer or in a countercurrent mixer and immediate application of the finished adhesive as a worm onto at least one of the substrates to be adhered. Pretreatment of the substrate surface in the sense of cleaning, roughening or other pretreatment is often not necessary. Also of interest is the process wherein no pre-mixing takes place; i.e., the two components are separately applied to the substrate(s) in a thin layer, with the substrates then pressed together.

Component b) is preferably present in the systems according to the invention in an amount such that 0.05 to 0.95, preferably 0.1 to 0.9, groups of component b) which are reactive towards isocyanate groups are present for each isocyanate group of component a). A high tolerance of the adhesive system if the above-mentioned numerical ratio is not observed exactly is furthermore of interest. Isocyanate excesses do not adversely influence the adhesive system.

The substrates provided with adhesive are placed together, fixed and either left to harden at room temperature or subjected to a hardening process at elevated temperature. At elevated temperature, the condition of adhesion can be achieved more rapidly than at room temperature.

The customary devices, such as heating presses, heating dies, heating cabinets, hot air units and induction heating devices, can be used for hardening at elevated temperature.

The desired open time or hardening time can be varied within wide limits by the choice of hardening temperature and the choice of catalyst.

The small amount of epoxide used is also of interest. In view of the higher cost of the epoxide in contrast to the isocyanate, this is a great economic advantage. Another advantage of the adhesive according to the invention is that it can be processed in the absence of solvents.

The invention is further illustrated but is not intended to be limited by the following examples in which all parts and percentages are by weight unless otherwise specified.

EXAMPLES

Patent examples

Starting Compounds

Crude MDI 4,4'-Diisocyanatodiphenylmethane mixed with its isomers and higher homologues, such as are obtained by phosgenation of aniline-formaldehyde condensation products, NCO content 30.4%, viscosity $\eta 25°$ C.=80 mPas.

Epoxide

Bisglycidyl ether derivative of bisphenol A, which can also still contain hydroxyl functions, of the formula

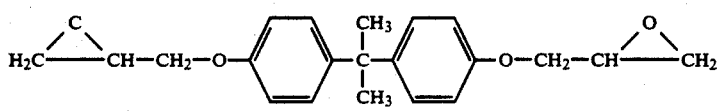

Polyether 1

Polypropylene glycol of 2,000 molecular weight
OH number=56 mg KOH/g.

Polyether 2

Polypropylene glycol of 220 molecular weight
OH number=515 mg KOH/g.

Polyether 3

Polyether started from propylene oxide on pentaerythritol of
$\overline{M}=410$ molecular weight; OH number=550 mg/KOH/g.

Polyether 4

Polyether started with propylene oxide on ethylene diamine with a molecular weight of 470 and an OH number of 480 mg KOH/g.

Catalyst 1

A compound having the structure:

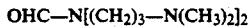

OHC—N[(CH$_2$)$_3$—N(CH$_3$)$_2$]$_2$

IPDA 5-amino-1-aminomethyl-1,3,3-trimethyl-cyclohexane

Example 1 (isocyanate component according to the invention)

900 parts by wt. crude MDI and 100 parts by wt. epoxide are mixed thoroughly at room temperature, and 6.6 g of a 1 molar solution of methyl p-toluenesulphonate in crude MDI as the solvent are added. The mixture is then heated at 120° C. for half an hour. Isocyanate content: 27.4%.

Example 2 (isocyanate component according to the invention)

800 parts by wt. crude MDI and 200 parts by wt. epoxide are mixed as in example 1, 6.6. g of a 1 molar solution of methyl p-toluenesulphonate in crude MDI are added and the mixture is heated at 120° C. for half an hour. Isocyanate content: 24.3%.

Example 3 (isocyanate component according to the invention)

700 parts by wt. crude MDI and 300 parts by wt. epoxide are mixed as in 5 example 1, the same amount of methyl p-toluenesulphonate is added and the mixture is heated at 120° C. for half an hour. Isocyanate content: 21.3%.

Example 4 (polyol component according to the invention)

300 parts by wt. polyether 1, 100 parts by wt. polyether 2 and 100 parts by wt. polyether 3 are brought together and mixed thoroughly. 1.6 parts by wt. catalyst 1, 6.65 parts by wt. IPDA and 40.7 parts by wt. of a paste of 65% zeolite, mixed in 35% castor oil, are furthermore added. The OH number of the mixture is 237.0 mg KOH/g.

Testing of the adhesive properties

To test the shear strengths, single-shear joints were produced from the materials to be joined (SMC, steel, aluminum or galvanized steel). The adhesive joint thickness was 0.8 mm, the sample width 20 mm and the overlapping length 10 mm. Setting was effected in a laboratory drying cabinet at various temperatures for various residence times using fixing devices. The SMC test specimens were hardened with heating jaws. The following adhesive mixtures were used:

| Isocyanate component example | Hydroxyl component example | Weight ratio NCO:OH comp. | Isocyanate Index | Mixture |
|---|---|---|---|---|
| 1 | 4 | 0.88:1 | | A |
| 2 | 4 | 1:1 | 135 | B |
| 3 | 4 | 1.13:1 | | C |

The two components were mixed in a polyethylene bag with exclusion of air. Several test specimens were produced and the mean value of the tensile shear strength (in accordance with DIN 53 283) was then calculated.

| | Substrate | | | | |
|---|---|---|---|---|---|
| | Oiled steel | Degreased steel | SMC | Aluminum | Galvanized Iron |
| Experiments with mixture A | | | | | |
| a) Testing at room temperature | | | | | |
| Setting conditions: | | | | | |
| 30 min 180° C.; + | | | | | |
| 30 min room temperature; + | | | | | |
| 20 min 220° C. | | | | | |
| Tensile shear strength (N/mm$^2$) | 25.2 | 27.4 | | | |
| b) Testing at room temperature; | | | | | |
| Setting conditions: | | | | | |
| 30 min at 220° C. | | | | | |
| Tensile shear strength (N/mm$^2$) | 25.1 | 25.8 | | | |
| c) Testing at 85° C. | | | | | |

-continued

| | | |
|---|---|---|
| Setting conditions: | | |
| 30 min at 180° C., + | | |
| 30 min room temperature, + | | |
| 20 min 220° C. | | |
| Tensile shear strength (N/mm²) | 8.9 | 11.6 |
| d) Testing at 85° C.; | | |
| Setting conditions: | | |
| 30 min at 220° C. | | |
| Tensile shear strength (N/mm²) | 10.8 | 10.1 |

Experiments with mixture B

| | | | |
|---|---|---|---|
| a) Testing at room temperature | | | |
| Setting time· | | | |
| 24 min at room temperature | | | |
| Tensile shear strength (N/mm²) | | 9.2* | |
| b) Testing at room temperature | | | |
| Setting conditions: | | | |
| 2 min 120° C., + | | | |
| 30 min room temperature, + | | | |
| 20 min 140° C. | | | |
| Tensile shear strength (N/mm²) | | 8.5* | |
| c) Testing at room temperature | | | |
| Setting conditions: | | | |
| 30 min 180° C. | | | |
| Tensile shear strength (N/mm²) | 22.9 | 23.4 | 13.9 |
| d) Testing at room temperature | | | |
| Setting conditions: | | | |
| 30 min 180° C., + | | | |
| 30 min room temperature, + | | | |
| 20 min 220° C. | | | |
| Tensile shear strength (N/mm²) | 29.7 | 31.4 | 20.4 |
| e) Testing at room temperature | | | |
| Setting conditions: | | | |
| 30 min 220° C. | | | |
| Tensile shear strength (N/mm²) | 22.0 | 25.8 | 15.5 | 23.4 |

Experiments with mixture C

| | | |
|---|---|---|
| a) Testing at room temperature | | |
| Setting conditions: | | |
| 30 min 180° C.; + | | |
| 30 min room temperature; | | |
| 20 min 20° C. | | |
| Tensile shear strength (N/mm²) | 32.8 | 32.1 |
| b) Testing at room temperature | | |
| Setting conditions: | | |
| 30 min at 220° C. | | |
| Tensile shear strength (N/mm²) | 33.9 | 34.7 |
| c) Testing at 85° C. | | |
| Setting conditions: | | |
| 30 min 180° C., + | | |
| 30 min room temperature, + | | |
| 20 min 220° C. | | |
| Tensile shear strength (N/mm²) | 11.4 | 12.6 |
| d) Testing at 85° C. | | |
| Setting conditions: | | |
| 30 min at 220° C. | | |
| Tensile shear strength (N/mm²) | 13.5 | 16.8 |
| e) Testing at 150° C. | | |
| Setting conditions: | | |
| 30 min 180° C., + | | |
| 30 min room temperature, + | | |
| 20 min 220° C. | | |
| Tensile shear strength (N/mm²) | 2.7 | 2.6 |
| f) Testing at 150° C. | | |
| Setting conditions: | | |

-continued

| | | |
|---|---|---|
| 30 min at 220° C. | | |
| Tensile shear strength (N/mm²) | 2.4 | 3.7 |

| | Test temp: | | |
|---|---|---|---|
| | 150° C. | 180° C. | 200° C. |
| g) Testing at 150° C. to 200° C. | | | |
| Tack-free conditions: 30 min. at 220° C. | | | |
| Surface treatment: Exposure to flame | | | |
| Substrate: Polyphenylene sulfide filled with 45% glass fiber | | | |
| Tensile shear strength (N/mm²) | 7.5 | 3.9 | 3.1 |

*100% adhesive component failure

Example 5- no mix application 300 pbw of polyether 1, 200 pbw of polyether 4, 100 pbw of polyether 2 and 6.4 pbw of IPDA were combined and mixed well. The OH number of the mixture was 247.3. The polyol mixture and the isocyanate component of Example 1 were applied onto 2 cards with the use of a glass rod as thin and as uniform as possible. The two cards were then arranged with the coated sides facing each other such that an overlapping test part was formed. A glass plate was then placed on top of the cards and a 250 gram weight was put on top of the glass plate. After allowing the part to remain overnight, the test part can only be torn so that the tear runs parallel to the adhesive layer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component adhesive comprising:
    a) a storage-stable mixture comprising
        1) at least one organic polyisocyanate and
        2) at least one epoxide which has been stabilized against reaction with a1) by reaction with an alkylating agent and
    b) a storage-stable component having molecular weights from 62 to 12,000 selected from the group consisting of
        1) at least one organic compound containing at least one hydroxyl group and at least one amino group,
        2) at least one organic compound containing at least two hydroxyl groups and no amino groups,
        3) a mixture of an organic compound containing at least two hydroxyl groups and no amino groups and an organic compound containing at least two amino groups and no hydroxyl groups, and
        4) mixtures thereof.

2. The adhesive of claim 1, characterized in that components a) and b) contain customary auxiliaries and additives selected from the group consisting of fillers, dyestuff and pigment.

3. The adhesive of claim 1, wherein component b) contains at least one catalyst selected from the group of tertiary amines in an amount such that the total mixture of a) and b) contains at least 0.005 mol tertiary amine nitrogen per 100 g.

4. The adhesive of claim 1, wherein the polyisocyanate in a1) is a polyisocyanate which is liquid at room temperature, a polyisocyanate mixture of the diphenylmethane series or a derivative, which is liquid at room temperature, of such a polyisocyanate or polyisocyanate mixture.

5. The adhesive of claim 1, wherein the epoxide a2) is a bisglycidyl ether derivative of bisphenol A.

6. The adhesive of claim 1, wherein component b) contains polyols having a molecular weight of 62–6,000 and at least one low molecular weight diamine.

7. The adhesive of claim 1, wherein component b) has a functionality of from 2 to 5 and a molecular weight of from 62 to 12,000.

8. The adhesive of claim 1, wherein component a) contains 5 to 40 wt. % bisglycidyl ether of bisphenol A or equivalent amounts of other epoxide-containing compounds, and the amount of component b) is chosen so that 0.05 to 0.95 mol isocyanate-reactive groups of component b) are present per mol isocyanate groups of component a).

9. The adhesive of claim 1, wherein the alkylating agent used for stabilizing the epoxide is methyl iodide, dimethyl sulphate or a sulphonic acid alkyl ester having a molecular weight of 110 to 250 and 1° and 4° C. atoms in the alkyl radical.

* * * * *